Nov. 25, 1930.  G. E. GRIMM  1,782,817
COMBINATION FLOOR BOARD
Filed Jan. 12, 1926  2 Sheets-Sheet 1
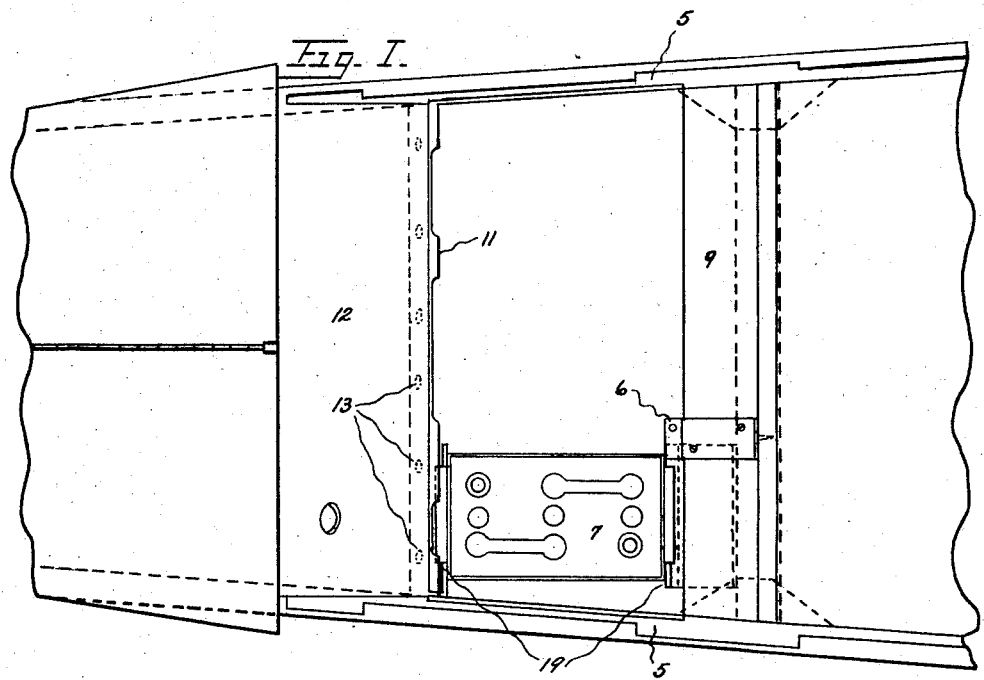
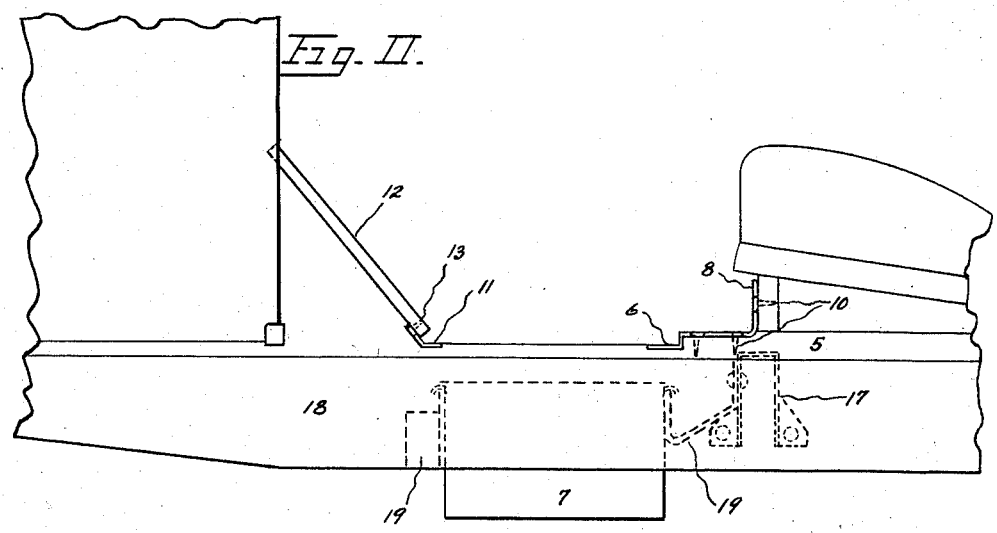
INVENTOR.
GEORGE E. GRIMM
BY Solon J. Boughton
ATTORNEY.

Nov. 25, 1930.  G. E. GRIMM  1,782,817
COMBINATION FLOOR BOARD
Filed Jan. 12, 1926    2 Sheets-Sheet 2
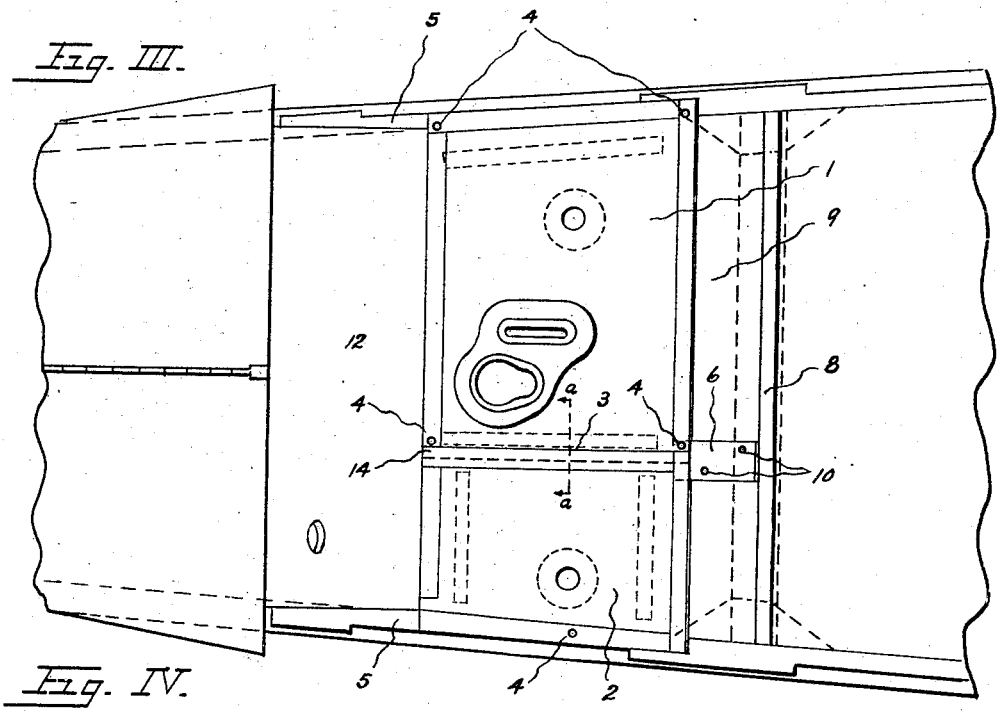
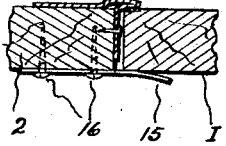
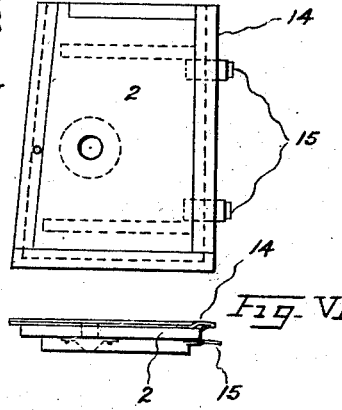
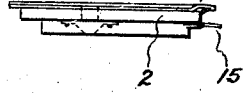
INVENTOR.
GEORGE E. GRIMM.
BY
ATTORNEY.

Patented Nov. 25, 1930

1,782,817

UNITED STATES PATENT OFFICE

GEORGE E. GRIMM, OF TOLEDO, OHIO, ASSIGNOR TO THE WILLYS-OVERLAND COMPANY, OF TOLEDO, OHIO, A CORPORATION OF OHIO

COMBINATION FLOOR BOARD

Application filed January 12, 1926. Serial No. 80,770.

This invention relates to motor vehicles, and more particularly to floor-boards for motor-vehicles having batteries beneath the floor.

One of the objects of the invention is to provide a floor-board for a motor-vehicle having a battery beneath the floor, that will be readily removable for inspecting the battery.

Another object of the invention is to provide a divided floor-board for a motor-vehicle, in which one of the floor-board divisions is readily removable without disturbing the other division.

A further object of the invention is to provide a divided removable floor-board for a motor-vehicle in which the adjacent edges of the divided portions are maintained in alignment.

Other objects of the invention will appear from the description to follow covering certain embodiments of the invention which, for the purposes of the present application, I have illustrated in the accompanying drawings, in which:

Figure I is a plan view of a portion of a motor vehicle with the floor-board removed, showing the battery in position.

Fig. II is a side elevation of the portion of a motor vehicle shown in Fig. I.

Fig. III is a plan view of the portion of a motor vehicle shown in Figs. I and II with the floor-boards in place.

Fig. IV is a plan view of the larger portion of the divided floor-board.

Fig. V is a sectional view on a larger scale taken on line a—a of Fig. III.

Fig. VI is a plan view of the smaller or battery covering portion of the floor-board.

Fig. VII is an end view of the floor-board shown in Fig. IV.

Fig. VIII is an end view of the floor-board shown in Fig. VI.

Motor vehicle batteries are frequently suspended from the frame of the vehicle, and when so located it is customary to place them under a removable floor-board, in order that they may be readily inspected or removed. The removal of a large board is somewhat bothersome, and usually requires the removal of a number of bolts which are used to rigidly secure the floor-board to the vehicle. The present invention purposes to eliminate the before-mentioned annoyances by dividing the floor-board longitudinally of the vehicle and independently securing each portion to the vehicle.

Referring to the drawings, in which like characters refer to like parts throughout the views, I have shown a floor-board composed of a portion 1 and a smaller portion 2, which align and approximately meet on the line 3. Portion 1 is preferably secured to the vehicle body by a plurality of bolts 4 which secure the board to the body-sill 5 and to the bracket 6. Portion 2, which need be but slightly larger than the top of battery 7, is preferably secured to the opposite body-sill 5, by a smaller number of bolts 4, one only being shown in the drawing which number usually suffices. Bracket 6, which supports the rear inner corners of floor-board portions 1 and 2, is secured to any suitable body parts such as heel board 8 and fixed floor 9, by screws 10, and should be of sufficient width to allow both portions 1 and 2 to rest thereon. The forward edge of the floor board portions are preferably supported by a flanged member 11, attached to the toe board 12 by any suitable means such as screws 13.

The before-mentioned method of attachment may allow some slight misalignment of portions 1 and 2. Therefore I prefer to provide one of the floor board portions with a flanged moulding 14, which overlaps the adjacent board. Spring members 15 are secured to the under side of the portion provided with the moulding, and are secured to the board portion by suitable means such as screws 16, the springs being so formed that they bear against the under side of the adjacent floor-board portion and maintain the moulding 14 in resilient contact with the underlying adjacent board.

Floor board 2 is located immediately above battery 7 which is supported by the vehicle frame 17 intermediate the frame side members 18 by any suitable means such as brackets 19, and I prefer to make floor-board portion 2 somewhat larger than the top of battery 7, so that the battery may be removed, as well as inspected, without disturbing portion 1.

It may be readily seen from the foregoing description, that I have provided a floor board which is fully as substantial and neat in appearance as the conventional floor-board, and in addition permits the independent removal of a small portion scarcely larger than the top of the underlying battery. If desired, the larger portion of the floor-board may be firmly secured to the vehicle by a greater number of bolts than is ordinarily used, as the infrequent removal of the larger portion permits more permanent fastening means than that used with the full width board employed heretofore.

While I have illustrated and described somewhat in detail, certain embodiments of my invention, it is to be understood that this showing and description are illustrated only, and that I do not regard the invention as limited to the details of construction illustrated and described, except insofar as I have included such limitations within the terms of the following claim.

I claim as my invention:

In a motor vehicle having a battery, a floor board above the battery, said floor-board being formed in two independent sections, one of which is immediately above the battery and readily removable, a flange on one of said sections for engaging the upper edge of the adjacent section, and spring means independent of the flange on one of said sections for urging the other section against said flange.

In testimony whereof, I affix my signature.

GEORGE E. GRIMM.